United States Patent [19]

Mojden

[11] 4,323,150
[45] Apr. 6, 1982

[54] MAGNETIC RAIL CONSTRUCTION
[75] Inventor: Wallace W. Mojden, Hinsdale, Ill.
[73] Assignee: Fleetwood Systems, Inc., Countryside, Ill.
[21] Appl. No.: 146,161
[22] Filed: May 2, 1980
[51] Int. Cl.³ .............................................. B65G 15/58
[52] U.S. Cl. .................................................. 198/690
[58] Field of Search .............................. 198/690, 387; 355/302-306

[56] References Cited

U.S. PATENT DOCUMENTS

| | | | |
|---|---|---|---|
| 2,645,745 | 7/1953 | Moreton | 335/306 |
| 3,120,891 | 2/1964 | Cmiel | 198/690 |
| 3,338,374 | 8/1967 | Dudley . | |
| 3,742,852 | 7/1973 | Leffier et al. | 335/306 |
| 3,818,399 | 6/1974 | Edwards | 335/306 |
| 3,830,353 | 8/1974 | Mojden . | |

Primary Examiner—Joseph E. Valenza
Assistant Examiner—Brian Bond
Attorney, Agent, or Firm—Trexler, Bushnell & Wolters, Ltd.

[57] ABSTRACT

A magnetic conveyor has a directional transition zone in which magnetically permeable pole plates are arranged with permanent magnets underlying the traveling belt. Magnetic elements of comparatively large magnetic moment per unit volume are situated in the space between the belt and the pole plates in order to concentrate the available lines of magnetic flux in the transition zone.

5 Claims, 6 Drawing Figures

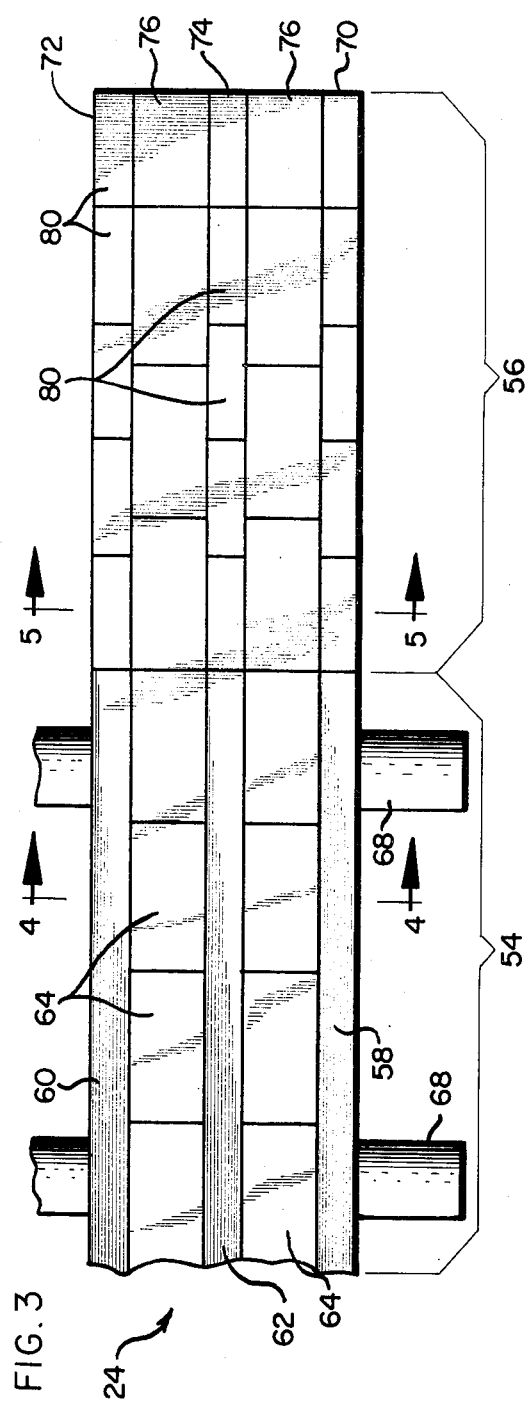
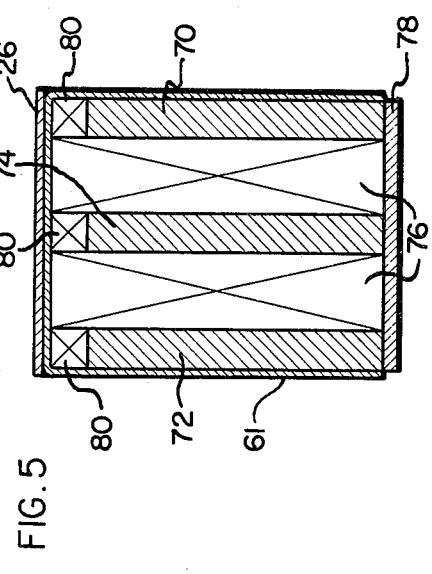
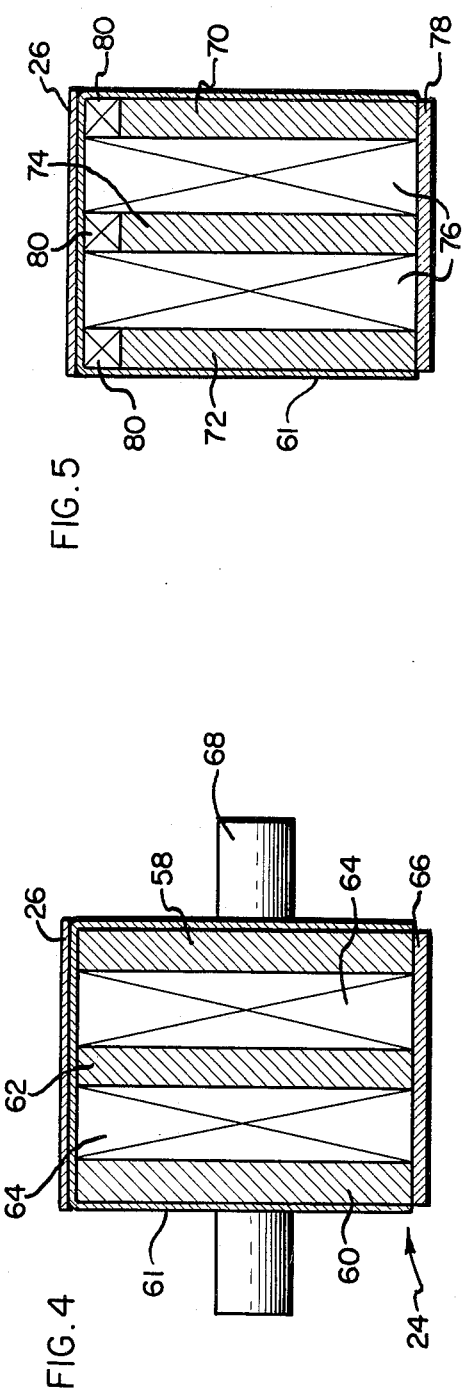

MAGNETIC RAIL CONSTRUCTION

BACKGROUND OF THE INVENTION

This invention relates generally to magnetic conveyor systems and more particularly to the construction of direction-changing sections for use in such systems.

Tinplate and other steel containers of various styles are advantageously transported at high speed through the in-plant environment by means of belt conveyors; and magnetic adhesion is usefully employed to position the containers on the rapidly moving belts. Conveyor zones where the containers are caused to change direction present a problem. As a result of inertia, the moving containers have a tendency to fly off the belt; and this is especially true of filled containers because the inertial forces are greatly increased by the added weight of the contents.

Both high belt speeds, on the order of 1,400 containers per minute, and directional changes from vertical to horizontal travel aggravate the problem. Moreover, the customary use of a transition roll or wheel at the point of transfer restricts the space available for magnetic circuitry; and thus in practice, the magnetic forces actually diminish where they are most needed.

SUMMARY OF THE INVENTION

Accordingly, an important object of the present invention is to provide an arrangement of magnetic circuitry of particularly high field strength for use in the direction-changing sections of magnetic conveyor systems.

A more general object of the invention is to provide a new and improved magnetic conveyor system.

These and other objects of the invention will become more apparent from a consideration of the following descriptions.

BRIEF DESCRIPTION OF THE DRAWINGS

In order that the principles of the invention may be readily understood, a single embodiment thereof applied to a conveyor of the elevator type, but to which the application is not to be restricted, is shown in the accompanying drawings wherein:

FIG. 3 is a view taken substantially along the line 3—3 of FIG. 2, with the filled containers and traveling belt removed in order to reveal the arrangement of the magnetic rail system;

FIG. 4 is a cross sectional view taken substantially along the line 4—4 of FIG. 3;

FIG. 5 is a further cross sectional view taken substantially along the line 5—5 of FIG. 3 and showing the magnetic force enhancement system of the present invention; and FIG. 6 is an enlarged, central sectional view taken through the transition roll of the conveyor system of FIG. 1.

DETAILED DESCRIPTION OF THE INVENTION

Figure 1:
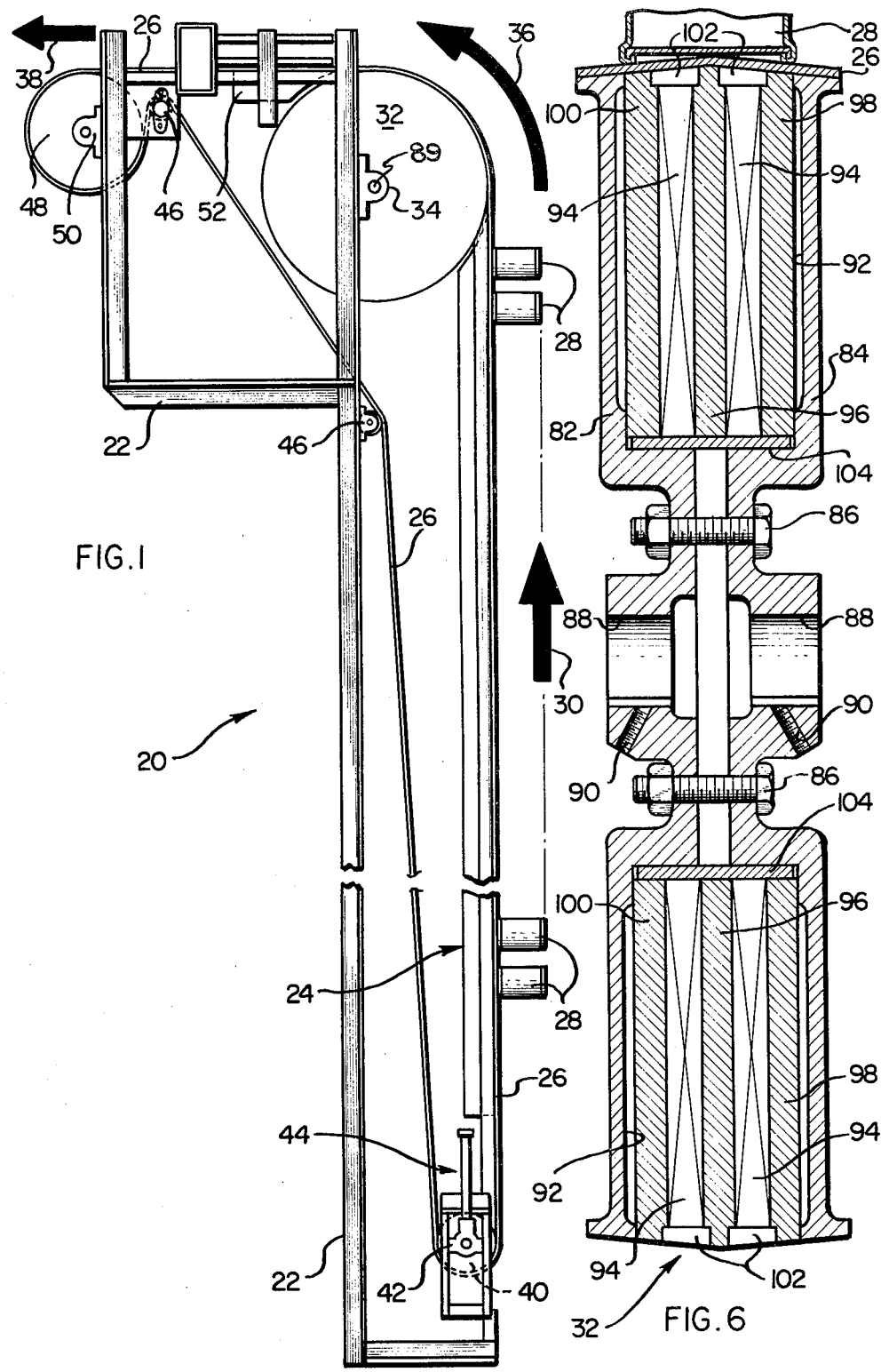
FIG. 1 is a side elevational view on a substantially reduced scale of a magnetic conveyor system of the elevator type for use in raising filled cans from one height level to another.

Referring now in detail to the drawings, and giving first attention to FIG. 1, a magnetic conveyor system of the elevator type which is constructed in compliance with the present invention is shown generally by the reference numeral 20. The conveyor system 20 broadly comprises a conveyor frame arrangement 22; an ascending magnetic rail arrangement 24; an endless, flexible traveling belt 26; and a suitable roller system which will be described more fully hereinafter. Conventional indexing and feeding equipment, not shown, advances filled tinplate containers 28 one-at-a-time into magnetically coupled relationship at the lower end of the magnetic rail arrangement 24; and the containers 28 move in the direction of belt travel indicated generally by the arrow 30. A magnetic transition roll 32 is mounted for rotation in suitable journals 34 at the upper end of rail arrangement 24 to define a directional transition zone for the tinplate containers 28. The transition roll 32 directs the containers in an arcuate path indicated generally by the arrow 36 and into a direction of horizontal travel indicated generally by the arrow 38.

The gravitationally lower end of the belt 26 is guided over a roll 40 which is mounted in vertically positionable journals 42. The journals 42 are resituatable by a piston-type arrangement 44 for adjusting tension in the belt 26. The path of belt 26 is additionally defined by idler rolls 46 and an outboard roll 48 which is mounted for rotation in suitable journals 50. An auxiliary horizontal magnetic rail system 52 is arranged as a takeoff for the containers 28 exiting the transition roll 32, with the container 28 being diverted from the auxiliary system 52 to other conveyor means (not shown).

Figure 2:
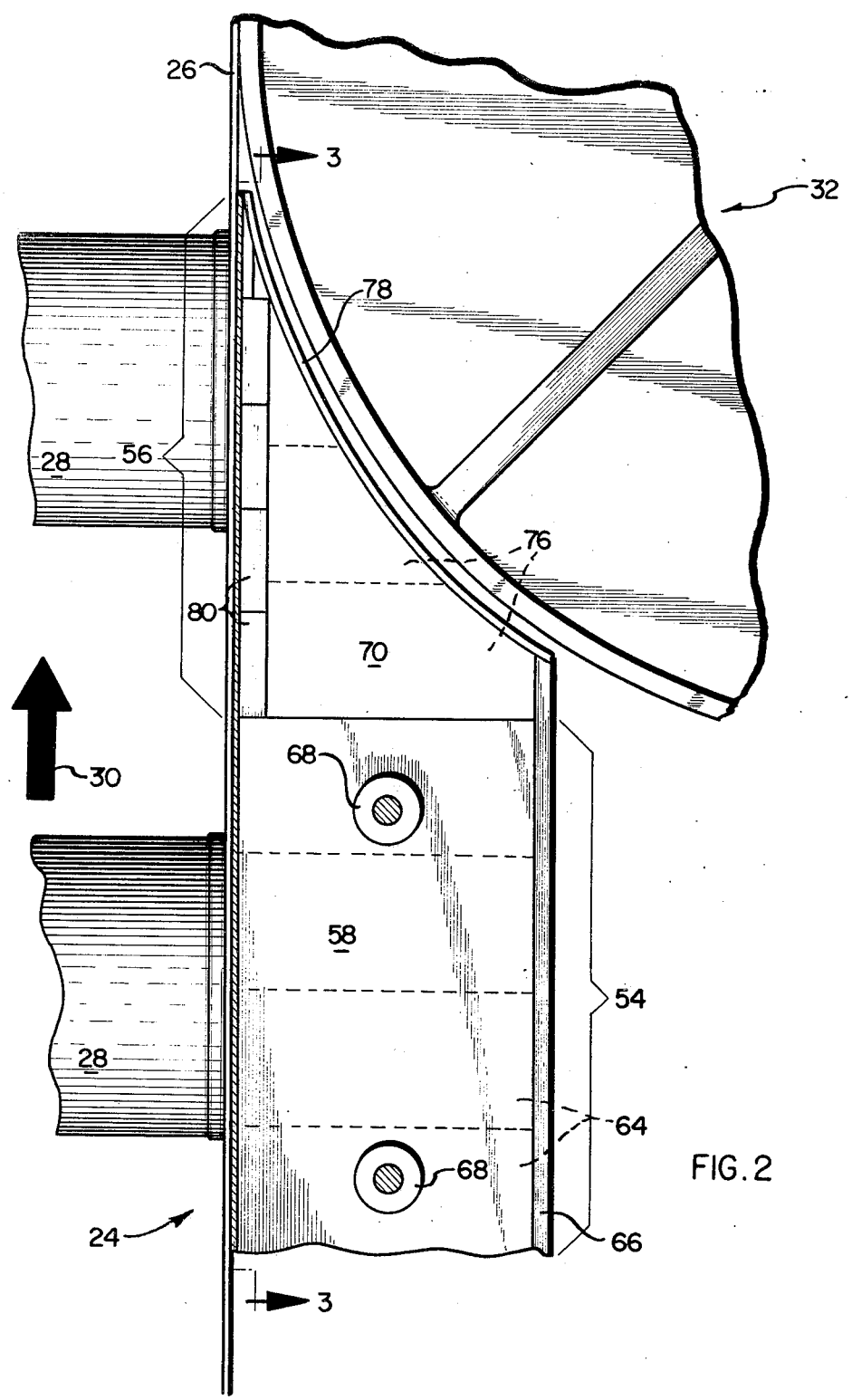
FIG. 2 is an enlarged side elevational view of the uppermost or transition zone of the conveyor system of FIG. 1, taken as seen from the opposite side of that which is shown in FIG. 1.

Turning now to a consideration of FIGS. 2 and 3, the magnetic rail system 24 is seen to comprise a conventional travel zone 54 constituting the principal length of the assembly and a transition zone 56 adjacent the roll 32. According to known practices, the rail system 24, in the travel zone 54, includes longitudinally extending pole plates and permanent magnets which are arranged in a three-pole scheme. Specifically, a pair of magnetically permeable outer pole plates 58 and 60 sandwich an inner pole plate 62 in spaced apart relationship. Permanent magnets 64 are aligned to fill the spaces between the pole plates 58, 60 and 62 so as to create "north" polarity in the outer pole plates 58 and 60 and "south" polarity in the inner pole plate 62. A non-magnetic keeper plate 66 is positioned beneath the poles of the plates 58, 60 and 62 and the magnets 64, as is shown in FIG. 4, in order to support said elements. Transverse bars 68 are usefully employed in supporting the magnetic rail system 24 in the conveyor frame 22; and a non-magnetic housing 69 surrounds the pole plates and magnets to define a bed or support for the traveling belt 26.

Continuing with reference to FIGS. 2 and 3 and with supplementary reference to FIG. 5, the transition zone 56 will be seen to embrace magnetically permeable outer pole plates 70 and 72 and an inner pole plate 74 which are magnetic extensions, respectively, of the pole plates 58, 60 and 62. In like manner, permanent magnets 76 are situated between the pole plates 70, 72 and 74 so that the outer pole plates exhibit "north" polarity and the inner pole plate 74 displays "south" polarity. In addition, a non-magnetic keeper 78 is disposed beneath the permanent magnets and pole plates in the transition zone 56; and cooperates with a non-magnetic housing 79, which is an extension of housing 69, to provide support for the elements.

As is best shown in FIG. 2, the pole plates and permanent magnets in the transition zone 56 are of progressively diminishing dimension in the direction of belt travel indicated by the arrow 30 and as the magnetic rail system approaches the roll 32 tangentially. In order to compensate for the resultant loss of magnetic strength, the present invention calls for the situation of a plurality of magnetic elements 80 overlying the pole plates 70, 72 and 74, as is shown in FIG. 5, and spaced generally between the pole plates and the traveling belt 26. The magnetic elements 80 are specifically selected to be of comparatively large magnetic moment per unit volume in order to concentrate the available lines of magnetic flux in the transition zone 56 and to exhibit an energy product of at least about 20 $B_dH_d$. For this purpose, the magnetic elements 80 are fabricated from an intermetallic compound of cobalt and a rate earth element. These materials are sintered and oriented so as to exhibit great resistance to demagnetization.

Giving consideration now to FIG. 6, the transition roll 32 comprises two circular rims 82 and 84 which are fastened together using bolts 86 and which are fabricated of suitable cross section and with matching central apertures 88 which together form a bore to receive a shaft 89, shown in FIG. 1, on which the transition roll 32 is mounted for rotation. Each of the rims 82 and 84 is desirably drilled and tapped with bores 90 to receive set screws for fastening the transition roll on its shaft.

The circular rims 82 and 84 are fashioned to define a peripheral yoke 92 therebetween; and the yoke 92 confines a suitable number of arcuate permanent magnets 94 between an inner magnetically permeable pole piece 96 and a pair of outer arcuate pole plate elements 98 and 100. The permanent magnets 94 are arranged to induce "south" polarity in the inner pole piece 96 and "north" polarity in the outer pole plates 98 and 100 in order that the transition roll 32 may coincide magnetically with the magnetic rail arrangement 24.

In compliance with the present invention, the transition roll 32 is provided with a central annular crown for engaging the flexible belt 26 and transferring its shape to the belt as is shown in the upper portion of FIG. 6. When the containers 28 are fabricated with peripheral rims, this crown reaches the center of the container end, reducing the air gap and enhancing the magnetic interaction between the pole plates 96, 98 and 100 and the magnetically permeable material of the container.

Structurally, the inner pole plate elements 96 are selected to have greater radial extent than the companion outer pole plate elements 98 and 100; and a suitable number of non-magnetic spacer elements 102 are aligned radially with the permanent magnets 94, the spacer elements 102 being of generally trapezoidal cross section with the greater height adjacent the inner pole plates 96 to cooperate in defining a raised spine for crowning the transition roll 32 and thereby the transfer belt 26. Desirably, an arcuate magnetic shunt or keeper 104 magnetically interconnects the relatively inboard ends of the permanent magnets 94 and the pole plates 96, 98 and 100.

The non-magnetic spacer elements 102 are usefully fabricated from an aluminum alloy or other non-magnetic material; and the crown provided on the roll 32 is advantageously selected to be on the order of 5°.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. In a magnetic conveyor system which includes a traveling endless conveyor means having an outer surface for engaging and transporting a series of containers, a magnetic rail system including pole plates and permanent magnets disposed opposite said container-engaging surface, and a rotatable transition roll adjacent one end of said rail system and cooperating with said conveyor means in defining a directional transition zone, the combination comprising: magnetically permeable pole plate means disposed in said directional transition zone, spaced from said belt and aligned with the pole plates of said rail system generally in the direction of belt travel; permanent magnet means interjacent said pole plate means for inducing opposite polarities therein; said pole plate means proximate said transition zone having the upper surface thereof recessed with respect to said conveyor means and magnetic elements of comparatively larger magnetic moment per unit volume than said permanent magnets disposed in the space between said conveyor means and the upper surface of said pole plate means whereby to concentrate the available lines of magnetic flux in said transition zone.

2. In a magnetic conveyor system, the combination defined in claim 1 wherein said pole plate means and said permanent magnet means are of progressively diminishing dimension in the direction of belt travel.

3. In a magnetic conveyor system, the combination defined in claim 1 wherein said magnetic elements have an energy product of at least about 20 $B_dH_d$.

4. In a magnetic conveyor system, the combination defined in claim 1 wherein said magnetic elements are of an intermetallic compound of cobalt and a rare earth element.

5. In a magnetic conveyor system which includes a traveling endless conveyor means having an outer surface for engaging and transporting a series of containers and a magnetic rail system including pole plates and permanent magnets disposed opposite said container-engaging surface, the combination comprising: a rotatable transition roll engaging said conveyor means in a transition zone to change the direction of travel of the conveyor means, including arcuate pole plate means, arcuate permanent magnet means disposed adjacent said pole plate means for inducing opposite polarities therein, and arcuate non-magnetic spacer elements aligned with said arcuate permanent magnet means radially outwardly thereof to cooperate in defining a raised spine for crowning said roll and enhancing magnetic interaction with the ends of peripherally rimmed containers; magnetically permeable pole plate means disposed in the directional transition zone defined between one end of the magnetic rail system and the transition roll, said pole plate means proximate said transition zone having the upper surface thereof recessed with respect to said conveyor means; permanent magnet means interjacent said pole plate means for inducing opposite polarities therein; and magnetic elements of comparatively larger magnetic moment per unit volume than said permanent magnet means disposed in the space between the conveyor means and the pole plate means whereby to concentrate the available lines of magnetic flux in said transition zone.

* * * * *